(12) United States Patent
Lewis

(10) Patent No.: US 7,252,407 B2
(45) Date of Patent: Aug. 7, 2007

(54) LIGHTING APPARATUS

(76) Inventor: Keith Lewis, 15 Birchfield Drive, Longridge, Preston, Lancashire, PR3 3HP (GB)

( * ) Notice: Subject to any disclaimer, the term of this patent is extended or adjusted under 35 U.S.C. 154(b) by 25 days.

(21) Appl. No.: 10/512,222

(22) PCT Filed: Apr. 22, 2003

(86) PCT No.: PCT/GB03/01699

§ 371 (c)(1),
(2), (4) Date: Jun. 8, 2005

(87) PCT Pub. No.: WO03/091623

PCT Pub. Date: Nov. 6, 2003

(65) Prior Publication Data

US 2005/0213331 A1    Sep. 29, 2005

(30) Foreign Application Priority Data

Apr. 23, 2002  (GB) ................................ 0209190.8

(51) Int. Cl.
*F21V 29/00* (2006.01)
(52) U.S. Cl. ...................... 362/294; 362/267; 362/547
(58) Field of Classification Search ................ 362/294, 362/373, 800, 267, 547
See application file for complete search history.

(56) References Cited

U.S. PATENT DOCUMENTS

| 5,086,378 | A | 2/1992 | Prince |
| 5,632,551 | A | 5/1997 | Roney et al. |
| 6,517,218 | B2* | 2/2003 | Hochstein .................. 362/294 |
| 2001/0030866 | A1 | 10/2001 | Hochstein |

FOREIGN PATENT DOCUMENTS

| DE | 199 22 176 A | 11/2000 |
| WO | WO 00 55685 | 9/2000 |

\* cited by examiner

*Primary Examiner*—Ali Alavi
(74) *Attorney, Agent, or Firm*—Michael Best & Friedrich LLP

(57) ABSTRACT

Lighting apparatus is provided comprising a light source (10), the light source being encapsulated in a protective medium (11) to seal the light source against ingress of moisture, the lighting apparatus having a heat sink (12, 13), the heat sink having a first region (12) in communication with light source (10) to receive heat from the light source (10) and a second region (13) which projects externally of the protective medium, such that the heat sink can dissipate heat to the ambient area. The invention provides light apparatus which is particularly suitable for use with caving lamps, although other uses are possible, for example in traffic lights or the lights of a motor vehicle, where the encapsulation would provide protection against rain.

20 Claims, 2 Drawing Sheets

Figure 7:
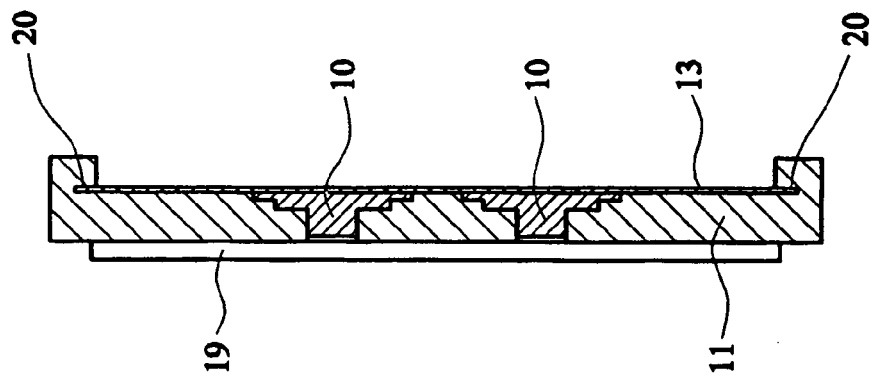

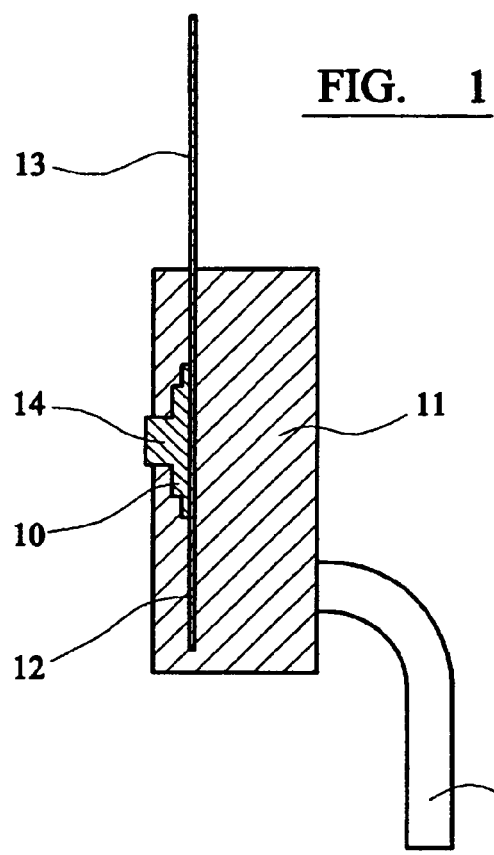
FIG. 1
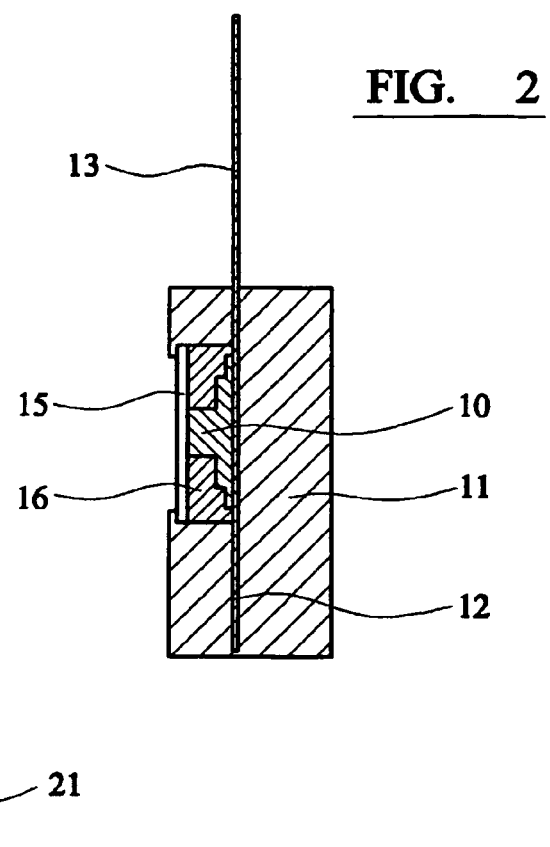
FIG. 2
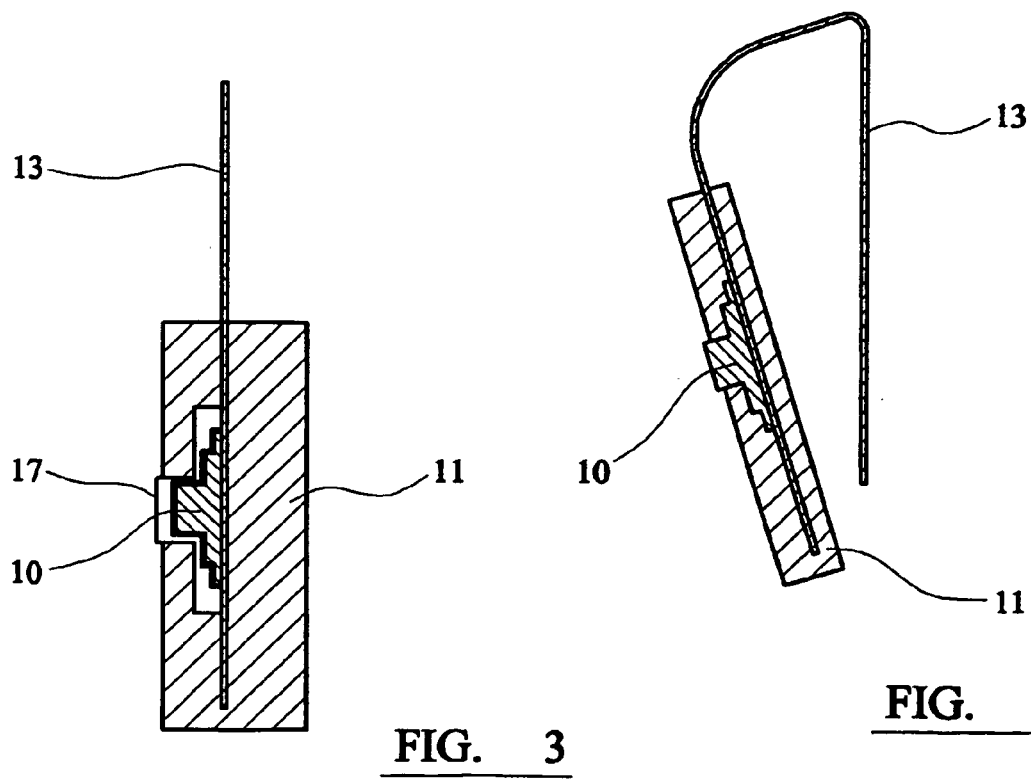
FIG. 3
FIG. 4

LIGHTING APPARATUS

"This application is a 371 of PCT/GB03/01699 filed on Apr. 22, 2003 which claims priority to United Kingdom application 0209190.8 filed on Apr. 23, 2002."

The invention relates to lighting apparatus comprising a light source, and particularly though not exclusively, to lighting apparatus for use in a damp or wet environment, for example when caving.

The invention provides lighting apparatus comprising a light source, the light source being encapsulated in a protective medium to seal the light source against ingress of moisture, the lighting apparatus including a heat sink, the heat sink having a first region in communication with the light source to receive heat from the light source, and a second region which projects externally of the protective medium, such that the heat sink can dissipate heat to the ambient area.

The light source may comprise a light emitting diode (LED).

The light source may have a light emitting region adjacent to, or projecting from, the protective medium.

Alternatively the light source may have a light emitting region protected by a cover, the cover being sealed to the protective medium and being such that light may pass through it.

The cover may be made of glass.

Alternatively the cover may be made of transparent or translucent plastics material.

The cover may comprise a collimating lens.

There may be more than one light source arranged within the protective medium.

The light source may be arranged to transmit light to the ambient area via a light transmitting conduit such as a light pipe or fibre optic bundle.

The heat sink may comprise a metal plate.

A preferred metal is aluminium and the aluminium may be anodised.

However other metals would be possible, for example copper.

The second region of the heat sink may serve more than one purpose.

It may for example carry manufacturer's information or advertising logos.

The second region of the heat sink could be shaped into a bracket, for example to fit into a socket on a standard miner's or caver's helmet.

The second region of the heat sink may be shaped to form a box or other enclosure.

While the light apparatus according to the invention has been particularly developed for use with caving lamps, other uses are possible, for example in traffic lights or the lights of a motor vehicle, where the encapsulation would provide protection against rain.

The second region of the heat sink may have a secondary function as part of a car body part such as a car wing.

By way of example specific embodiments of the invention will now be described, with reference to the accompanying drawings, in which:

FIG. 1 is a side cross sectional view through a first embodiment of lighting apparatus according to the invention; and FIGS. 2 to 7 are similar views of six other embodiments of the invention.

In the embodiment shown in FIG. 1, an LED 10 has polyurethane 11 moulded around it to form a solid block, encapsulating the LED.

The LED 10 is mounted on a heat sink in the form of an anodised aluminium plate having a first region 12 which is sealed within the block 11. The heat sink has a second region 13 which extends outside the block to enable the heat sink to dissipate heat to the ambient area.

A light emitting region 14 of the LED projects slightly from the block 11 to enable light to be transmitted by the lighting apparatus. Since however the polyurethane material completely surrounds the LED, there is no possibility of moisture reaching the electrical components of the LED.

The polyurethane material is substantially incompressible and as there are no hollows or voids within the lighting apparatus, it is immensely strong and resistant to shocks.

The LED may be switched on and off from outside the apparatus, for example magnetically using a reed switch or Hall effect transistor.

The LED may also be provided with a dimming device which can also be operated externally of the device, for example magnetically.

In the alternative embodiment shown in FIG. 2 the LED 10 is protected by a glass cover 15 which is sealed to the encapsulation material 11 by means of sealant resin 16.

A further embodiment is shown in FIG. 3 in which the LED 10 is protected by a transparent plastic cover 17 embedded within the encapsulation material 11.

FIG. 4 illustrates how the external part 13 of the heat sink may be given a secondary purpose. In the embodiment shown in FIG. 4, the portion 13 is bent into the shape of a bracket so that the lighting apparatus can easily be clipped onto a standard miner's or caver's helmet.

Figure 5:
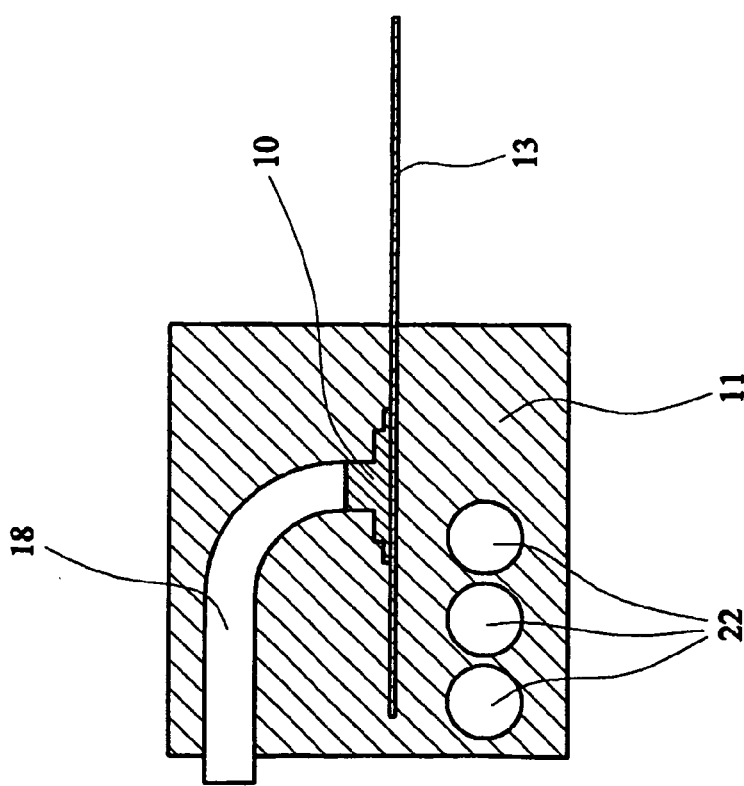

In the embodiment shown in FIG. 5, the LED 10 lies well within the encapsulation material 11, but light is transmitted to the outside of the encapsulation material 11 by means of a light pipe or fibre optic bundle 18.

Figure 6:
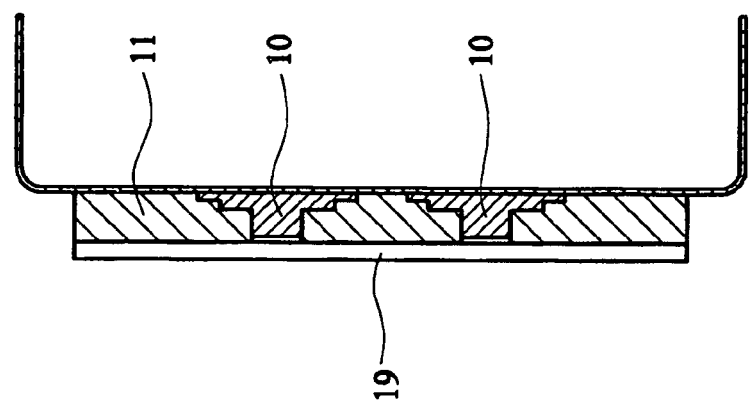

FIG. 6 illustrates yet another embodiment in which two LEDs 10 are arranged spaced apart within the encapsulating medium 11. The light emitting portions of the LEDs are protected by a cover 19, for example made of polycarbonate, sealed to the polyurethane 11. The heat sink may be shaped as shown in FIG. 6 to form a box of other enclosure. This form of light apparatus could, for example, be used as a vandal resistant luminaire, or for traffic lights, or for lighting for a motor vehicle. The exposed portions of the heat sink could for example form a car body part, such as a car wing.

FIG. 7 illustrates one more embodiment which is similar to that shown in FIG. 6 but in which the exposed, heat dissipating portion 13 of the heat sink comprises only the rear face of the heat sink, the edges 20 of the heat sink being enclosed within the polyurethane 11.

Each of the embodiments shown in the drawings may be provided with either an external or an internal power supply.

For example, as illustrated in FIG. 1, a power supply for the LED 14 may be an external power supply, fed to the LED 14 through the encapsulation material 11 by a power cable 21.

Alternatively, as shown in FIG. 5, power cells 22 may be embedded within the encapsulation material 11. The cells may be primary cells or secondary, rechargeable cells.

Although the lighting apparatus has been specifically developed for use with caving lamps, the apparatus according to the invention also makes an excellent apparatus for safe use in flammable atmospheres. Such light sources are generally referred to as being "intrinsically safe". Light apparatus according to the invention would be intrinsically safe because the light source is so well sealed from the environment and the heat sink can be sized so that operating temperatures are well below those required by safety or legislative requirements.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. Lighting apparatus comprising a light emitting diode (LED), the LED being encapsulated in a protective medium, the lighting apparatus including a heat sink, the heat sink having a first region in communication with the LED to receive heat from the LED, and a second region which projects externally of the protective medium such that the heat sink can dissipate heat to the ambient area, wherein the LED is mounted on the first region of the heat sink and the mounting and the electrical components of the LED are encapsulated in the protective medium to seal the LED against ingress of moisture.

2. Lighting apparatus as claimed in claim 1, provided with a dimming device.

3. Lighting apparatus as claimed in claim 1, in which the LED has a light emitting region adjacent to, and projecting from, the protective medium.

4. Lighting apparatus as claimed in claim 1, in which the LED has a light emitting region protected by a cover, the cover being sealed to the protective medium and being such that light may pass through the cover.

5. Lighting apparatus as claimed in claim 4, in which the cover is made of glass.

6. Lighting apparatus as claimed in claim 4, in which the cover is made of transparent or translucent plastics material.

7. Lighting apparatus as claimed in claim 4, in which the cover comprises a collimating lens.

8. Lighting apparatus as claimed in claim 1, in which there is more than one LED arranged within the protective medium.

9. Lighting apparatus as claimed in claim 1, in which the LED is arranged to transmit light to the ambient area via a light transmitting conduit.

10. Lighting apparatus as claimed in claim 9 in which the light transmitting conduit comprises a light pipe.

11. Lighting apparatus as claimed in claim 9 in which the light transmitting conduit comprises a fibre optic bundle.

12. Lighting apparatus as claimed in claim 1, in which the heat sink comprises a metal plate.

13. Lighting apparatus as claimed in claim 12, in which the metal is aluminium.

14. Lighting apparatus as claimed in claim 1, in which the second region of the heat sink serves more than one purpose.

15. Lighting apparatus as claimed in claim 14, in which the second region carries manufacturer's information or advertising logo information.

16. Lighting apparatus as claimed in claim 14, in which the second region is shaped into a bracket, to fit into a socket on a standard miner's or caver's helmet.

17. Lighting apparatus as claimed in claim 14, in which the second region is shaped to form a box or other enclosure.

18. Lighting apparatus as claimed in claim 15, in which the second region has a secondary function as part of a car body or a car wing.

19. Lighting apparatus as claimed in claim 1, in which the LED is mounted directly on the first region of the heat sink.

20. Lighting apparatus as claimed in claim 1, in which there are no hollows or voids within the lighting apparatus.

* * * * *